(12) United States Patent
Krueger (10) Patent No.: US 9,926,056 B2
(45) Date of Patent: Mar. 27, 2018

(54) SMALL WATERCRAFT END PORTION TRANSPORTATION DEVICE

(71) Applicant: Michael John Krueger, Littleton, CO (US)

(72) Inventor: Michael John Krueger, Littleton, CO (US)

(73) Assignee: Michael John Krueger, Englewood, CO (US)

( * ) Notice: Subject to any disclaimer, the term of this patent is extended or adjusted under 35 U.S.C. 154(b) by 278 days.

(21) Appl. No.: 14/993,958

(22) Filed: Jan. 12, 2016

(65) Prior Publication Data

US 2017/0197695 A1    Jul. 13, 2017

(51) Int. Cl.
    *B63C 13/00*    (2006.01)

(52) U.S. Cl.
    CPC .................... *B63C 13/00* (2013.01)

(58) Field of Classification Search
    CPC ................... B63C 13/00; B60P 3/10
    USPC ........................................... 114/344
    See application file for complete search history.

(56) References Cited

U.S. PATENT DOCUMENTS

| | | | | |
|---|---|---|---|---|
| 1,370,592 A * | 3/1921 | King | ................ | B63C 13/00 114/344 |
| 3,462,781 A * | 8/1969 | Olvera | ................ | B63C 13/00 114/344 |
| 3,567,241 A * | 3/1971 | Foschino | ................ | B63C 13/00 280/414.2 |
| 4,392,665 A * | 7/1983 | Miller | ................ | B63C 13/00 114/344 |
| 4,465,291 A * | 8/1984 | Wylie | ................ | B63C 13/00 280/47.24 |
| 4,602,802 A * | 7/1986 | Morgan | ................ | B63B 35/7946 114/344 |
| 5,291,848 A * | 3/1994 | Wilhelm | ................ | B63B 59/02 114/343 |
| 5,791,279 A * | 8/1998 | Hart | ................ | B63C 13/00 114/344 |
| 5,975,003 A * | 11/1999 | Manson | ................ | B63C 13/00 114/344 |
| 6,364,336 B1 * | 4/2002 | Jenkins | ................ | B63C 13/00 280/414.2 |
| 2005/0167935 A1 * | 8/2005 | Weeks | ................ | B62B 1/26 280/47.331 |

* cited by examiner

*Primary Examiner* — Christopher R Harmon (57) ABSTRACT

A small watercraft end portion transportation device utilizes a hull cradle attached to a hull carrier to protect a watercraft during portage. The hull cradle has form-fitting cradle plates which wrap around the sides of the bow or stern and support the underside hull. Plate cushions can be used to more evenly distribute pressures to the cradle and protect the craft. Tie attachments, tie cables and tie downs can be used to secure the craft in the cradle. The lower hull carrier uses a number of hull carrier supports which together support the cradle above a carrier wheel assembly and provide additional plate protection to the craft and cradle. A modified set of rear hull carrier supports extend downwards from the lower hull carrier and attach to a carrier wheel assembly. The hull carrier supports act as independent suspension systems to absorb shock from the wheels.

20 Claims, 6 Drawing Sheets

SMALL WATERCRAFT END PORTION TRANSPORTATION DEVICE

TECHNICAL FIELD

The present invention relates generally to the field of small watercraft; more specifically, to the field of accessories for moving small watercraft across land; and more particularly still, to a small watercraft end portion transportation device.

BACKGROUND

Since the early days of boats and watercraft, people have had a need to relocate their watercraft between bodies of water. Whether it be between closely spaced ponds/lakes or portaging around hazards in a stream/river, dragging a canoe, kayak, boat or other watercraft (collectively "craft") across dry land can be difficult, dangerous and damaging. Early peoples often placed logs under their craft and slowly pushed the craft forward, shifting a newly appearing log from the rear to a newly created open space under the front of the craft as they moved forward. With the advancement of the wheel, carts or wagons began to be used; but such conveyances were often large and heavy and rarely could be carried in the craft between uses. Small craft such as canoes were usually just dragged or carried, but many a craft suffered holes, dents, and other damage as it bounced over, or was dragged across, logs, rocks, etc.

In more recent times, small portable carts have begun to appear. However, many of them are still too heavy/bulky to carry in the craft between uses; instead, they are mainly used to launch a craft from a land vehicle or associated trailer and then are stowed back in the land vehicle while the craft is used on a single body of water. Leaving the user with the options of carrying or dragging their craft whenever a portage is necessary during the trip.

There are a few carts which are portable enough to carry within a craft and can be used when a portage situation is encountered during a trip. These carts still retain a number of problems including being heavy and cumbersome as well as flimsy and easily broken. Furthermore, they do not fully support and protect the craft they are carrying, leaving the craft vulnerable to damage, especially when used by a single individual who is portaging his or her craft by themselves. Another common failing among portable carts is that they are designed for smooth terrain such as trails and roads and quickly fail when used in areas with boulders, logs, rocks, brush and other serious travel impediments. Many such carts have exposed axels, wheel spokes, and other parts which are easily snagged in difficult terrain. Further, they are not custom fit to the particular craft on which they are used so they do not fit the craft snugly and provide opportunities for brush and other impediments to get caught (e.g., in the gaps between the cart and the craft). A number of carts provide no spring or give between the wheels and the portion of the cart that holds the craft. Thus, any impact to a wheel (such as falling off a rock into a hole and jarring when it hits bottom) is directly transferred to the craft itself, again risking damage to the craft. In order to make existing carts as light as possible, some manufacturers have relied upon flimsy materials and/or poor designs which collapse when carrying heavily laden craft across difficult terrain. Such failures can be life threatening when they occur far from help and strand the unfortunate user with either a damaged craft or one that is too heavy to portage without the assistance of a cart.

A number of cart designs attach to the middle of a craft. The user then pushes or pulls the craft from one end. However, such designs leave the other end of the craft completely exposed to the dangers of difficult terrain where jagged rocks, sharp stumps, and other impediments can easily damage the craft and end the fun adventure. Even those few carts which attach at an end of the craft do not protect the bow or stern keel.

Another common failing of known carts is that they do not securely attach to a craft; thus risking detachment during difficult portages resulting in damage to craft and/or cart. Carts that do not provide any cushion between the craft and the contact points of the cart can cause rubbing, wear, and other damage to the craft as well as again directly transferring to the craft any impacts or shocks to which the cart is exposed.

What is needed is a compact, portable cart that provides easy, one-person transport of multiple types and styles of craft across rough terrain; simply and securely attaches to a craft; provides shock and cushion to protect the craft from rough terrain, protects the keel and its transition up the stern and/or bow; and allows easy, one-person transport of the craft across rough terrain.

SUMMARY

One embodiment of a small watercraft end portion transportation device comprises an upper hull cradle and a lower hull carrier. The upper hull cradle comprises a form-fitting curved set of cradle plates which wrap around both the port and starboard sides of either the bow or stern of a craft as well as supporting the underside of the craft's hull. The cradle plates are attached to each other to form a cradle that can be form-fitted to the shape/size of a given bow/stern and bottom hull of a craft. Between the cradle plates and the craft, a plurality of plate cushions can be attached to more evenly distribute the contact pressure to the cradle and further protect the craft. The upper hull cradle securely holds the craft while also providing protection to it from rocks, logs, and obstacles that might otherwise impact the craft during transport. A plurality of tie attachments can be integrated into the upper hull cradle allowing for a plurality of tie cables to attach to the upper hull cradle. A plurality of tie downs can then attach to the tie cables and be secured around/to the craft in order to retain the craft in the cradle. The upper hull cradle can be removably or permanently attached to a lower hull carrier. The lower hull carrier comprises a plurality of hull carrier supports which together form a structure which supports the upper hull cradle above a carrier wheel assembly and provides additional plate protection to the craft and hull cradle. A modified set of rear hull carrier supports extend downwards from the lower hull carrier and attach to a carrier wheel assembly. The wheels can utilize one or more axles or they can be mounted independently of one another. The wheels can attach to the hull carrier supports which act as independent suspension systems to absorb shock. Relatively large wheels are preferable and they can have a significant plurality of rough-terrain tread on the tires. The wheels should be able to rotate freely, although a braking device and/or drive motor can be integrated if desired.

DETAILED DESCRIPTION

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Figure 1:
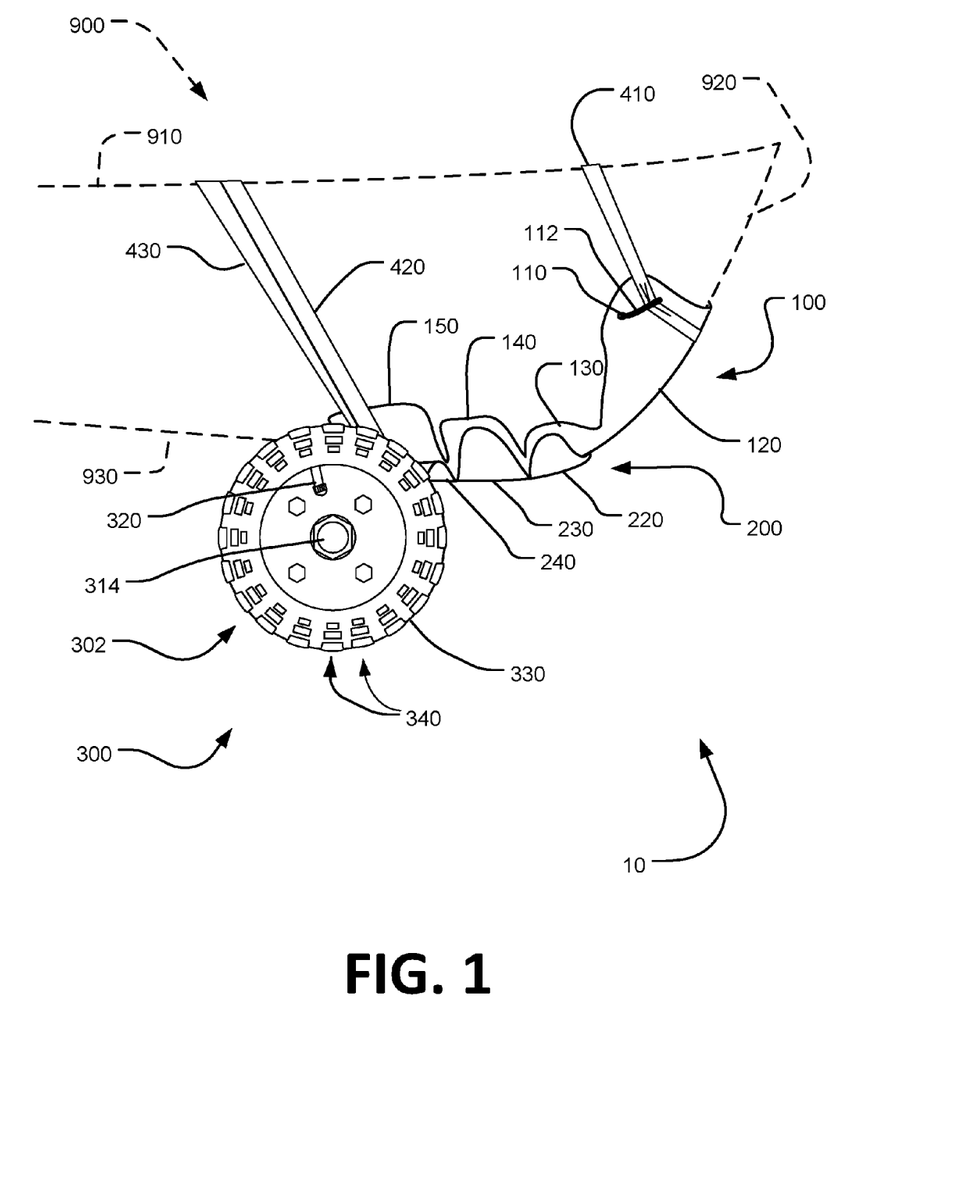
FIG. 1 illustrates a right side elevation view of an exemplary embodiment of a small watercraft end portion transportation device in place on an exemplary craft.

Referring now to the drawings, FIG. 1 illustrates a right side elevation view of an exemplary embodiment of a small watercraft end portion transportation device 10 in position on an exemplary craft 900. In this embodiment, the small watercraft end portion transportation device comprises an upper hull cradle 100 and a lower hull carrier 200. The upper hull cradle 100 comprises a form-fitting curved set of cradle plates 120, 130, 140 and 150 which wrap around both the port and starboard sides of either the bow or stern of a craft 900 as well as supporting the underside of the craft's hull 930. The set of cradle plates 120, 130, 140 and 150 are attached to each other to form a cradle that can be form-fitted to the shape/size of a given bow/stern and bottom hull 930 of a craft 900.

Between the cradle plates 120, 130, 140, and 150 and the craft 900, a plurality of plate cushions (not visible in FIG. 1, see FIGS. 3 and 6) can be attached to more evenly distribute the contact pressure to the cradle 100 and further protect the craft 900. The upper hull cradle 100 securely holds the craft 900 while also providing protection to it from rocks, logs, and obstacles that might otherwise impact the craft during transport.

Figure 2:
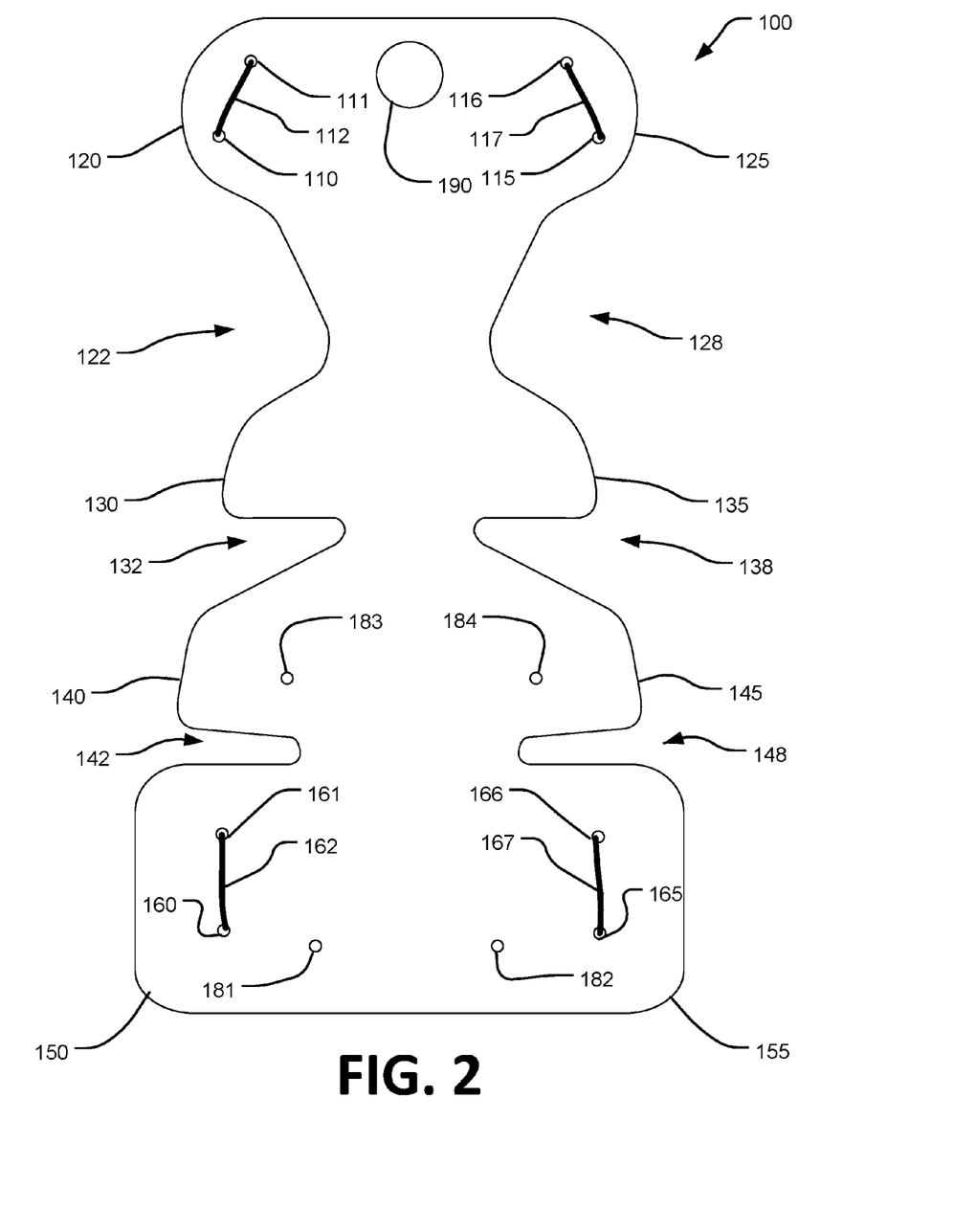
FIG. 2 illustrates a bottom plan view showing the underside of an exemplary embodiment of an upper hull cradle before the upper hull cradle has been formed to match a particular craft.

A plurality of tie attachments 110 (see FIG. 2, tie attachments 110, 111, 115, 116, 160, 161, 165, and 166) can be integrated into the upper hull cradle 100 allowing for a plurality of tie cables 112 (see FIG. 2, tie cables 112, 117, 162, and 167) to attach to the upper hull cradle 100. A plurality of tie downs 410, 420 and 430 can then attach to the tie cables 112 and be secured around/to the craft 900 in order to retain the craft 900 in the cradle 100. In other embodiments, the numbers of tie attachments 110, 111, 115, 116, 160, 161, 165 and 166, tie cables 112, 117, 162, and 167 and tie downs 410, 420, and 430 can be less than or greater than that shown in the FIGS. Additionally, in some embodiments, the tie attachments and tie cables form part of the tie downs, such that the tie downs can attach directly to the upper hull cradle and thence to the craft. In such embodiments, the tie attachments may be adhesives, screws, bolts, or other attachment means besides ports in the cradle as illustrated in FIG. 2.

The upper hull cradle 100 can be removably or permanently attached to the lower hull carrier 200. The lower hull carrier 200 comprises a plurality of hull carrier supports 220, 230 and 240 which together form a structure which supports the upper hull cradle 100 above a carrier wheel assembly 300 and provides additional plate protection to the craft 900 and hull cradle 100. A modified set of rear hull carrier supports 240 extend downwards from the lower hull carrier 200 and attach to a carrier wheel assembly 300. The wheels 302 and 303 (not shown in FIG. 1, see FIGS. 5 and 6) can utilize one or more axles 310 (see FIG. 5) or they can be independent of one another. In either case, relatively large wheels 302 and 303 are preferable and they can have a significant plurality of rough-terrain tread 340 on the tires 330 and 332. Larger knobby balloon tires 330 and 332 provide better protection against harsh terrain features such as sharp rocks, better traction against slippage on wet muddy surfaces, and the wide width enables the user to traverse sand more easily.

The wheels 302 and 303 should be able to rotate freely, although a braking device and/or drive motor can be integrated if desired. Possible sub-components of the right wheel 302 shown in FIG. 1 include the right inflation port 320 and right tire 330, it is assumed that a left inflation port and left tire could be used as well. Additionally, if an axel 310 is used, a right axel attachment 314 ensures that the right wheel 302 stays attached to the axel 310.

Note that the plurality of tie downs 410, 420 and 430 illustrated in the embodiment of FIG. 1 includes two located approximately above the carrier wheel assembly 300 and one on the top right plate 120. The plurality of tie downs 410, 420, and 430 function best if attached to fixed components of the craft 900. As shown in FIG. 1, strapping the tie downs over the craft gunwale 910 and attaching them to seats or other structural members inside the craft is recommended. For example, front tie down 410 can be attached to the carry handle on the front of a craft while mid tie down 420 and rear tie down 430 can be attached to a seat in the craft. Further, a user of the device 10 should ensure that the craft edge 920 and the craft hull 930 are firmly seated within the cradle 100 before securing the tie downs. The bottom center of the hull 930 is referred to as a keel. The keel transitions from the bottom of the hull 930 to become the craft edge 920 as it moves upwards above the waterline and to the ends of the bow and the stern. In a standard canoe, the bow and the stern both have a similar shape and resemble that shown in FIG. 1 (see generally the craft edge 920 area). However, there are other types of canoes (and craft) which have a box stern for easy mounting of a motor. With such craft, the small watercraft end portion transportation device 10 can be utilized effectively only on the bow.

FIG. 2 illustrates a bottom plan view showing the underside of an exemplary embodiment of an upper hull cradle 100 before the upper hull cradle 100 has been formed to match a particular craft. The upper hull cradle 100 comprises a number of plates. As shown in the embodiment illustrated in FIG. 2, the upper hull cradle has an upper hull cradle top right plate 120, an upper hull cradle top left plate 125, an upper hull cradle mid right plate 130, an upper hull cradle mid left plate 135, an upper hull cradle center right plate 140, an upper hull cradle center left plate 145, an upper hull cradle rear right plate 150, and an upper hull cradle rear left plate 155. The paired plates 120 and 125, 130 and 135, 140 and 145, and 150 and 155, respectively, can be formed as single units as illustrated in FIG. 2. In fact, in the cradle 100 illustrated in FIG. 2, the entire cradle 100 assembly can be formed as a single section of cradle material. This helps to ensure that the cradle 100 is relatively rigid and extremely tough. In other embodiments, multiple components can be attached together to form the cradle 100.

The plurality of cradle plates can be described as a plurality of port cradle plates (i.e., the left cradle plates) and a plurality of starboard cradle plates (i.e., the right cradle plates). Each port cradle plate has a paired starboard cradle plate attached thereto (for example, 155 and 150, 145 and 140, etc.) to form a set of cradle plates, and taken altogether, a plurality of sets of cradle plates.

Each of the plurality of sets of cradle plates are attached to one another (i.e., the set 150/155 is attached to the set 140/145 which is attached to the set 130/135 which is attached to the set 120/125) to form a cradle that can be removably wrapped around either the bow or stern of a watercraft and down to a portion of the underside of the hull as illustrated in FIG. 1. A plurality of plate gaps 122, 128, 132, 138, 142 and 148 is located between each of the plurality of sets of cradle plates. The plate gaps are adapted to allow the upper hull cradle to be custom-formed to match the shape of either the bow or stern of a craft and wrap around to the underside of the hull of the craft, again, as illustrated in FIG. 1, without overlapping each other or otherwise binding or interfering with the curve-forming process.

In the embodiment illustrated in FIG. 2, the upper hull cradle 100 is shown in its yet-to-be-formed configuration, i.e., "in the flat". Since there are many different craft each having differently shaped craft hulls and craft edges, the upper hull cradle 100 can be manufactured initially "in the flat" and then customized to fit each different craft configuration. For example, the flat cradle 100 shown in FIG. 2 can be heated and then pressed down on a mold of a craft. It then custom forms to the shape of the craft. The resulting form-fitting curved upper hull cradle resembles that illustrated in FIGS. 1 and 6. Since each cradle 100 can therefore be customized to each craft, the fit is very tight to better protect the craft and ensure very small gaps between the small watercraft end portion transportation device 10 and the craft 900. This helps to minimize opportunities for brush, plants, and other obstacles/debris to catch between the device and the craft during portage, ensuring minimal snags and reduced difficulty in moving the craft across land. Furthermore, because the cradle wraps around the bow (or stern) of the craft, it protects the most exposed portion of the craft during portages, helping to ensure the craft remains undamaged and serviceable after the portage is complete. Since craft are normally pulled by the user (rather than pushed), the plurality of plates 120, 125, 130, 135, 140, 145, 150, and 155 can act as skid plates so if the device 10 encounters logs, rocks or other obstacles, the plates take the impact and skid over the obstacle keeping the craft safe and moving.

Although not illustrated in FIG. 2, a plurality of protection pads can be used between the cradle and the craft. In such instances, the mold of the craft will need to have spacers built into it when the cradle is formed in order to accommodate the protection pads after forming.

As illustrated in FIG. 2, a plurality of tie attachments 110, 111, 115, 116, 160, 161, 165, and 166 can be integrated into the upper hull cradle 100 allowing for a plurality of tie cables 112, 117, 162, and 167 to attach thereto. In other embodiments, other types of tie attachments and tie cables (such as glue/epoxy points, bolts, clips, rings, anchors, etc.) are contemplated. The exact form of the tie attachments and tie cables is not critical as many different sub-components can provide the same function; what is needed are strong anchors that allow tie downs to be securely affixed to the hull cradle 100.

A plurality of tie downs 410, 420 and 430 (see FIG. 1) can then attach to the combinations of tie attachments and tie cables. Although only 3 right side (or starboard) tie downs are illustrated in FIG. 1, a set of additional mirror port side tie downs is also contemplated. In other embodiments single tie downs stretch from starboard across to port and can be secured to the craft 900 as they pass over it.

Also illustrated in FIG. 2 are a plurality of upper hull cradle attachment ports 181, 182, 183 and 184. These ports align with lower hull carrier attachment ports on the lower hull carrier (see FIG. 4, items 281, 282, 283, and 284) and provide attachments ports through which bolts or other attachment devices can be run to clamp the lower hull carrier 200 to the upper hull cradle 100. In other embodiments, other means of securing the lower hull carrier 200 to the upper hull cradle 100 are contemplated. In yet other embodiments the number of upper hull cradle attachment ports 181, 182, 183 and 184 is less than or greater than that shown in FIG. 2. Furthermore, it is contemplated in other embodiments that instead of being removably attached to one another, the upper hull cradle and lower hull carrier can be permanently affixed to each other.

Note the unique shape of each set of plates 120 and 125, 130 and 135, 140 and 145, and 150 and 155. They are each formed to provide specific functions in the transportation device 10. For example, the hull cradle right rear plate 150 and hull cradle left rear plate 155 are flatter than the others as they are positioned below the hull of the craft and take and distribute the most weight of the craft versus the other sets. They also protect and support the underside of the hull of the craft more than any of the other plates. Note that in the view in FIG. 2, the cradle is shown from the bottom plan view so the "left and right" descriptions are necessarily reversed from that illustrated in FIGS. 1 and 3.

The upper hull cradle center right plate 140 and the upper hull cradle center left plate 145 form the first set of hull plates that begin the curve transition from protecting and supporting the underside of the hull to protecting and supporting the craft edge.

The upper hull cradle mid right plate 130 and the upper hull cradle mid left plate 135 comprise the next plate set as you move upwards along the craft edge. This set may or may not be attached to the lower hull carrier. As less of the craft's weight is taken by this plate set, its main purpose is as a protective skid plate.

The upper hull cradle top right plate 120 and upper hull cradle top left plate 125 comprise the final set of plates in the upper hull cradle 100. These plates function as a protective skid for the craft edge, but also serve to firmly secure the craft to the top of the cradle. Located near a midline of the top plate set is a hanging port 190 which allows for easy grasping and storage of the small watercraft end portion transportation device 10, especially if a hang-thong, grasp rope, or other similar device is tied through the hanging port 190.

The plate gaps 122 and 128, 132 and 138, and 142 and 148 between each set of plates allow upper the cradle to be formed to the usual curved shapes of various craft hulls/edges without binding or overlap. If the upper hull cradle 100 lacked these gaps in the flat, it would have excess material when heated and formed to custom fit a craft, causing potential raised wear points, structural weak points, and other defects. Instead, the plate gaps 122, 128, 132, 138, 142 and 148 allow the plates to be curved upwards and wrapped around the craft without overlapping one another during the forming process.

Figure 3:
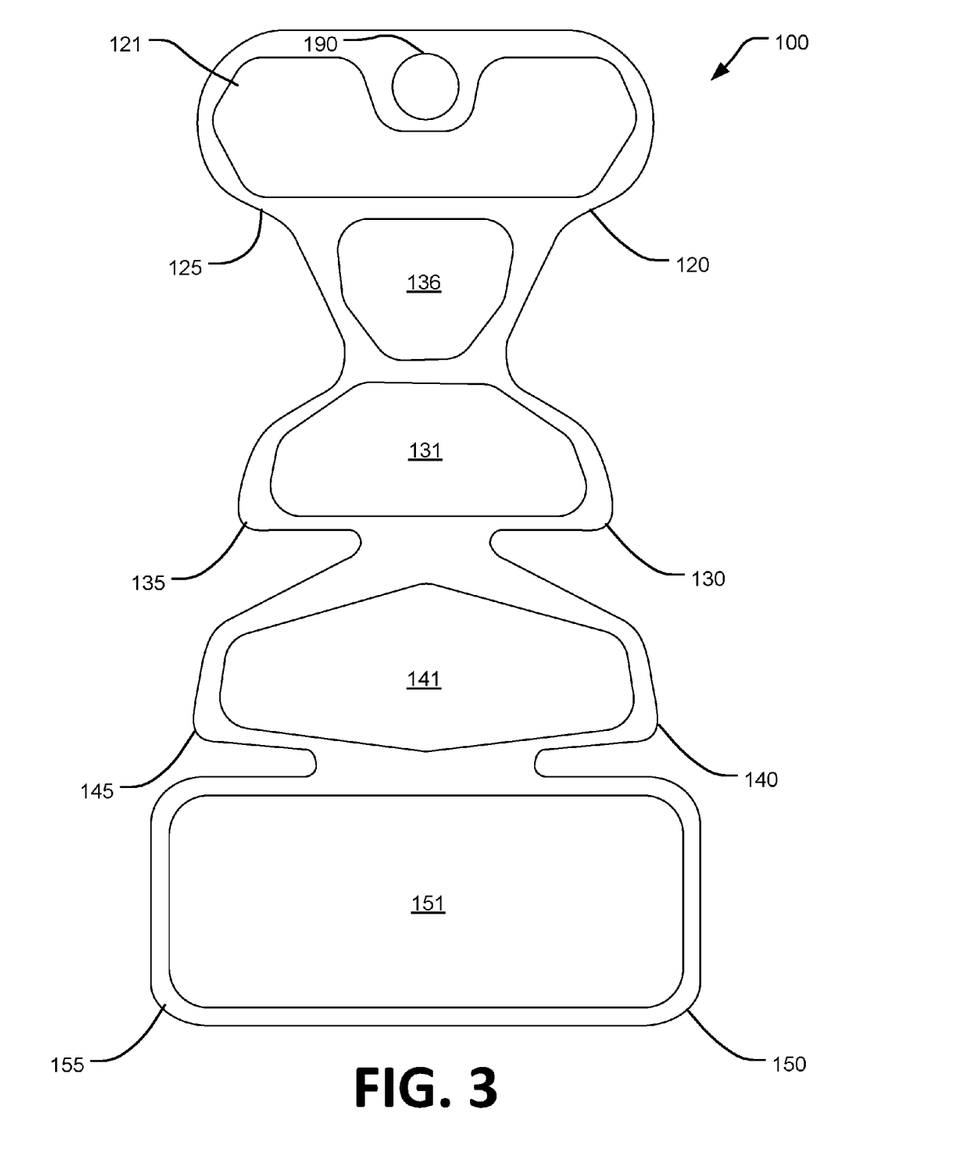
FIG. 3 illustrates a top plan view showing the top side of an exemplary embodiment of an upper hull cradle before the upper hull cradle has been formed to match a particular craft.

FIG. 3 illustrates a top plan view showing the top side of an exemplary embodiment of an upper hull cradle 100 before the upper hull cradle has been formed to match a particular craft. The new components illustrated in FIG. 3 include the plurality of protection pads 121, 131, 136, 141 and 151. These protection pads can be foam rubber, silicon, hard rubber, or any other suitable material that provides cushion and padding. The protection pads function to better distribute the weight of the craft to the upper hull cradle 100 while also protecting the craft from transmission of any impacts to the hull cradle 100. The shapes of the protection pads shown in FIG. 3 can vary in other embodiments. Furthermore, the plurality of protection pads can be removably or permanently affixed. For example, hook and loop material can be affixed to the upper hull cradle and the underside of each protective pad to allow them to be easily attached or detached from the hull cradle as needed. This facilitates upgrade or replacement of worn or damaged components. The plurality of protection pads illustrated in FIG. 3 includes an upper hull cradle top protection pad 121, an upper hull cradle top-mid protection pad 136, an upper hull cradle mid protection pad 131, an upper hull cradle center protection pad 141, and an upper hull cradle rear protection pad 151. Other embodiments may use other number, styles, shape and location of protection pads.

Figure 4:
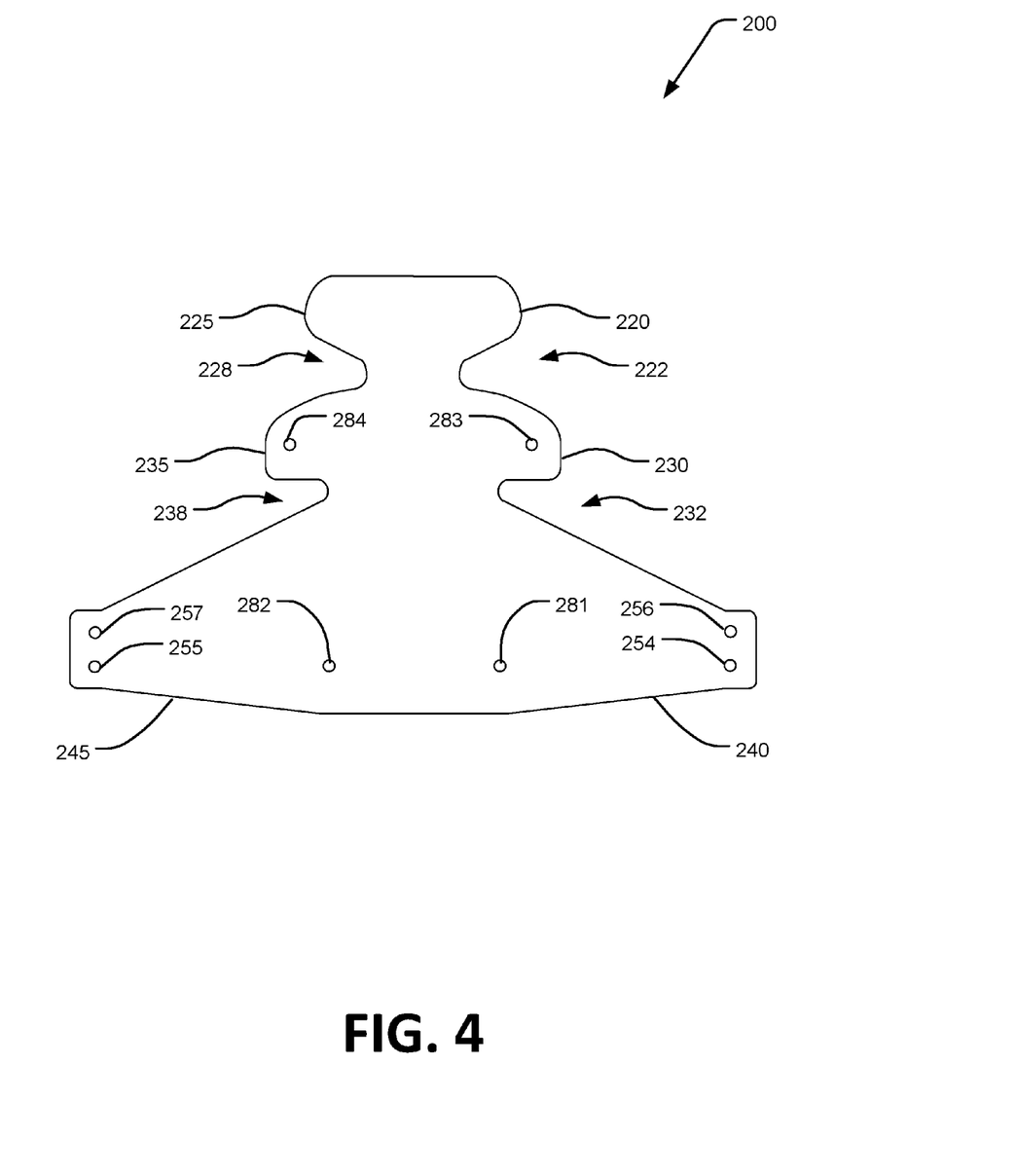
FIG. 4 illustrates a top plan view showing the top side of an exemplary embodiment of a lower hull carrier before the lower hull carrier has been formed to match the upper hull cradle and to extend the rear left and right supports downwards for attachment to the carrier wheel assembly.
Figure 5:
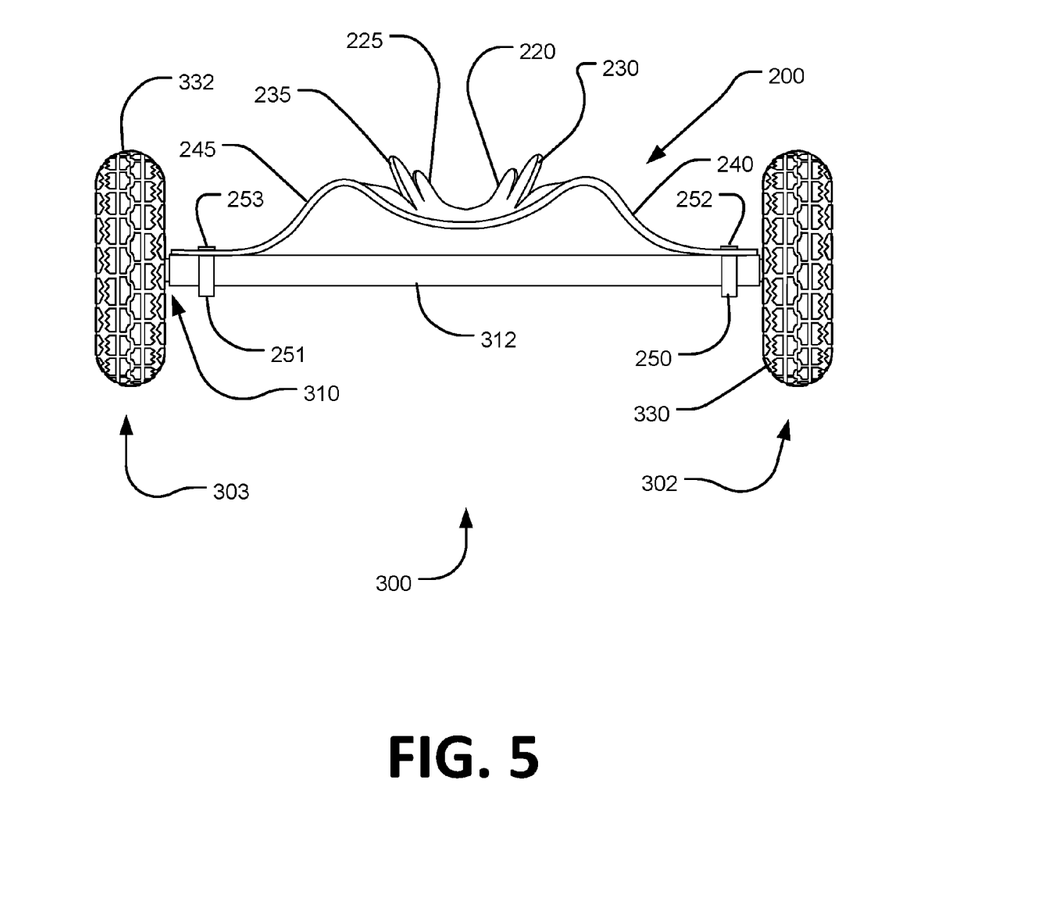
FIG. 5 illustrates a rear elevation view of an exemplary embodiment of a lower hull carrier and carrier wheel assembly attached thereto.
Figure 6:
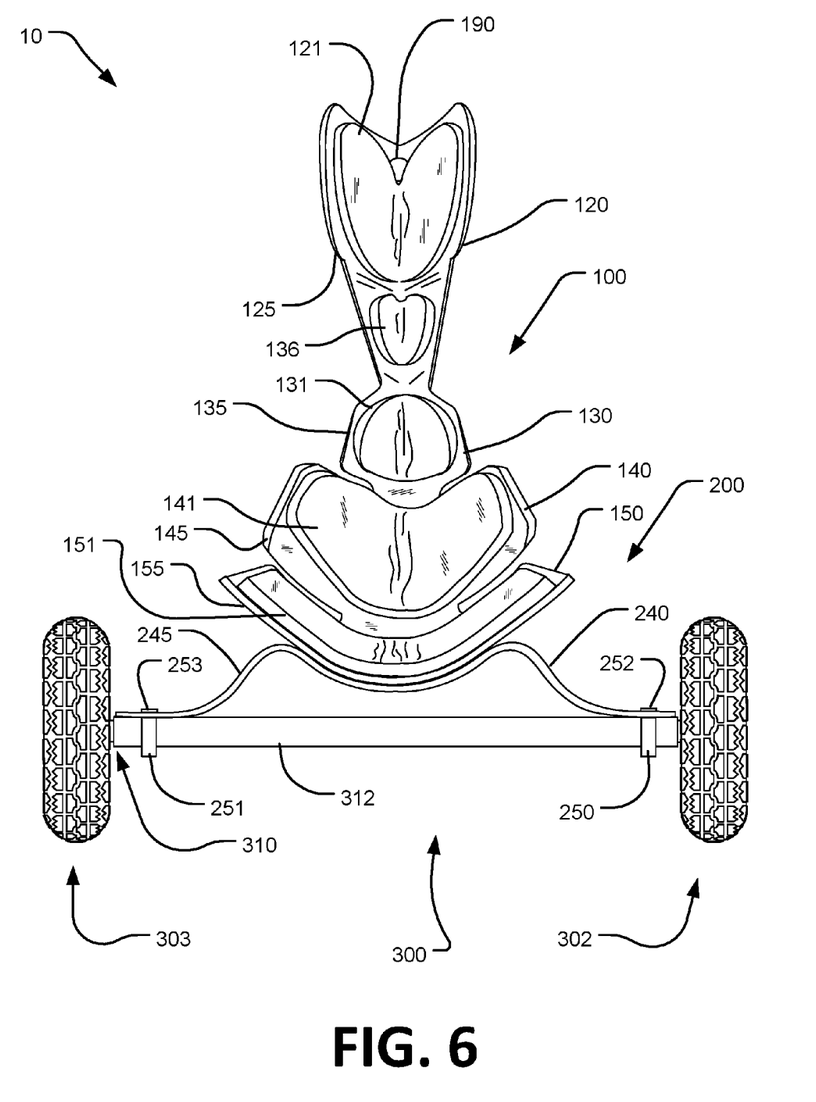
FIG. 6 illustrates a rear elevation view of an exemplary embodiment of a small watercraft end portion transportation device showing a formed lower hull carrier, a carrier wheel assembly, and a formed upper hull cradle.

FIG. 4 illustrates a top plan view showing the top side of an exemplary embodiment of a lower hull carrier 200 before the lower hull carrier has been formed to match the upper hull cradle 100 and to extend the lower hull carrier rear right and left supports 240 and 245 downwards for attachment to the carrier wheel assembly 300 (not shown in FIG. 4, see FIGS. 1, 5, and 6).

The lower hull carrier 200 comprises a plurality of supports. As shown in the embodiment illustrated in FIG. 4, the lower hull carrier has a lower hull carrier front right support 220 and a lower hull carrier front left support 225 (together, a front support set), a lower hull carrier mid right support 230 and a lower hull carrier mid left support 235 (together, a mid support set), and a lower hull carrier rear right support 240 and a lower hull carrier rear left support 245 (together, a rear support set). All of the left supports comprise a plurality of port hull carrier supports and the right supports comprise a plurality of starboard hull carrier supports. The paired support sets 220 and 225, 230 and 235, and 240 and 245, respectively, can be formed as single units as illustrated in FIG. 4. In fact, in the carrier 200 illustrated in FIG. 4, the entire lower hull carrier 200 assembly can be formed as a single section of carrier material. This helps to ensure that the carrier 200 is relatively rigid and extremely tough. In other embodiments, multiple components can be attached together to form the carrier 200.

In the embodiment illustrated in FIG. 4, the lower hull carrier 200 is shown in its yet-to-be-formed configuration, i.e., "in the flat". Since there are many different craft each having differently shaped craft hulls and craft edges, the lower hull carrier 200 can be manufactured initially "in the flat" and then customized to fit each different craft configuration. For example, the flat carrier 200 shown in FIG. 4 can be heated and then pressed down on a mold of a formed upper hull cradle 100 or on the formed hull cradle itself. It then custom forms to the shape of the cradle 100. The lower hull carrier rear right support 240 and lower hull carrier rear left support 245 are then curved downwards, leaving a cupped center area that forms to and attaches to the bottom of the upper hull cradle 100. The outside wingtips of the rear supports 240 and 245 are curved downwards so they can attach to a wheel assembly 300 and provide clearance between the transportation device 10, the craft 900, and the wheels 302 and 303. See the resulting shape of the lower hull carrier 200 in FIG. 5.

The resulting form-fitting curved lower hull carrier resembles that illustrated in FIGS. 1 and 5. Since each carrier 200 can therefore be customized to each craft, the fit is very tight to better protect the craft and ensure very small gaps between the carrier 200 and the cradle 100. This helps to minimize opportunities for brush, plants, and other obstacles/debris to catch therebetween during portage, ensuring minimal snags and reduced difficulty in moving the craft across land. Furthermore, because the carrier wraps upwards and around the bow (or stern) of the craft, it protects the most exposed portions of the craft and cradle during portages, helping to ensure they remain undamaged and serviceable. Since craft are normally pulled by the user (rather than pushed), the plurality of supports 220, 225, 230, 235, 240, and 245 can act as skid plates so if the device 10 encounters logs, rocks or other obstacles, the supports take the impact and skid over the obstacle keeping the craft safe and moving.

As illustrated in FIG. 4, a plurality of wheel assembly attachments 254, 256, 255, and 257 are included in the lower hull carrier 200. These function to allow attachment of the carrier 200 to the carrier wheel assembly 300. In the embodiment illustrated in FIG. 4, the wheel assembly attachments are configured in two sets of two, providing ports through which the ends of two U-bolts can protrude, trapping an axle between the U-bolts and the underside of the carrier 200 (see FIGS. 5 and 6).

Also illustrated in FIG. 4 are a plurality of lower hull carrier attachment ports 281, 282, 283, and 284, these align with a plurality of upper hull cradle attachment ports 181, 182, 183 and 184 (see FIG. 2). These ports provide attachments holes through which bolts or other attachment devices can be run to clamp the lower hull carrier 200 to the upper hull cradle 100. In other embodiments, other means of securing the lower hull carrier 200 to the upper hull cradle 100 are contemplated. In yet other embodiments the number of lower hull carrier attachment ports 281, 282, 283, and 284 is less than or greater than that shown in FIG. 4. Furthermore, it is contemplated in other embodiments that instead of being removably attached to one another, the upper hull cradle and lower hull carrier can be permanently affixed to each other.

Lower hull carrier front left and right supports 225 and 220 provide structural support to the upper hull cradle. The cradle can rest on these supports. In one embodiment the cradle is attached to the front supports. In another embodiment, no attachment between the front supports and the cradle exists, as the cradle can then float on the front supports. Additionally, the front supports act as an additional skid plate to help deflect obstacles and debris from the cradle and the craft.

The support gaps 222 and 228, and 232 and 238 between each set of supports allow the lower support carrier to be formed to match the shape of the upper hull cradle (which itself is formed to match the usual curved shapes of various craft hulls/edges) without binding or overlap. If the lower hull carrier 200 lacked these gaps in the flat, it could have excess material when heated and formed to custom fit a craft, causing potential raised wear points, structural weak points, and other defects. Instead, the support gaps 222, 228, 232, and 238 allow the supports to be curved upwards and wrapped around without overlapping one another during the forming process.

The plurality of support gaps 222, 228, 232, and 238 are located between each of the plurality of sets of carrier supports and are adapted to allow the lower carrier support to be custom-formed to match the shape of the underside of the formed upper hull cradle. The plurality of hull carrier supports 220, 225, 230, 235, 240, and 245 comprise at least two rear hull carrier supports 240 and 245 which have proximal ends attached to the upper hull cradle 100 and distal ends which extend downwards from the lower hull carrier 200 and attach to a carrier wheel assembly 300. The rear hull carrier supports 140 and 245 are adapted to act as shock absorbers so as to cushion any shocks experienced by the carrier wheel assembly 300 and attenuate any shock energy before it can be transmitted to the upper hull cradle 100.

FIG. 5 illustrates a rear elevation view of an exemplary embodiment of a lower hull carrier 200 and carrier wheel assembly 300 attached together. In the embodiment shown in FIG. 5, two U-bolts comprise the assembly connectors 250 and 251 which are utilized to secure the axle 310 to the lower hull carrier 200. Above the carrier 200, a plurality of securing nuts 252 and 253 lock down over the protruding ends of the assembly connectors 250 and 251 and secure the carrier to the axle. In other embodiments, other types of assembly connectors 250 and 251 are contemplated.

In the embodiment shown in FIG. 5, an axle 310 with an axle sheath 312 is illustrated. An axle sheath 312 can be utilized, as desired, to protect the axle and ensure a good grip for the assembly connectors 250 and 251 thereon. In other embodiments, no axle sheath 312 need be utilized. In fact, in some embodiments the axle itself is not used as the wheels 302 and 303 can instead be independent of one another in their attachment to the lower hull carrier 200.

The wheels 302 and 303 illustrated in FIG. 5 each have a tire 330 and 332 thereon. In this embodiment, the tires are inflatable. In other embodiments, they could be solid, foam, run-flats, or other types of tires. It is preferable that the wheels each be allowed to rotate independently of one another so as to better handle sharp turns and repositioning. However, a fixed relationship may also be employed. Additionally, although not illustrated in FIG. 5, a braking system can be utilized to ensure that the transportation device does not 'get away from' a user. This can be especially helpful when traversing a sharp slope with a heavily laden craft. Similarly, a power system can be employed as a drive mechanism to assist a person in maneuvering the transportation device 10.

Note the "M" shape of the lower hull carrier rear right and left supports 240 and 245 as viewed from this perspective. This shape provides clearance between the lower hull carrier and the wheel assembly 300 while also providing built-in shock-absorbers in the form of the rear supports 240 and 245 themselves. The supports can flex and bend (like a snowboard) to absorb sharp impacts, bumps, and other sharp changes in motion imparted by the rough terrain over which the small watercraft end portion transportation device 10 is being pulled so that these impacts and shocks are not transmitted directly to the cradle and the craft itself; with the added benefit of reducing muscle fatigue for the user.

The interior of the "M" shape of the hull carrier 200 is formed to meld with the underside of the cradle and securely hold it therein. The remaining supports 230, 235, 220, and 225 also help to hold and secure the cradle.

FIG. 6 illustrates a rear elevation view of an exemplary embodiment of a small watercraft end portion transportation device 10 showing a formed lower hull carrier 200, a carrier wheel assembly 300, and a formed upper hull cradle 100. Compare this view to the side elevation view of FIG. 1 to better understand the structures and components that make up the small watercraft end portion transportation device 10. Because of the formed nature of the cradle 100, the device 10 is custom-fit to a given craft (or at least type of craft). However, as many craft have very similar shapes and dimensions, it is feasible that a single device 10 can be utilized with more than one craft.

The unique "M" frame suspension functions in a manner where the weight carried by the device 10 is distributed more evenly. Prior art carts commonly fail while under portage over rough terrain. The overall weight of the craft being moved creates shock waves through the framework of many carts. These shock waves from the torque created from dropping of small ledges, large rocks, roots and logs can eventually lead to micro-cracks in the framework, which can then lead to catastrophic structural failure of the cart. The lower hull carrier 200 is designed so that each left and right rear support 245 and 240 acts as a suspension arm, having great independence from each other. When impact occurs, the shockwave is transferred from the tire, sent through the widened suspension arm, and distributed into the body of the device 10, then through the padding and eventually into the body of the craft, by which time the shockwave has faded out.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

What is claimed is:

1. A small watercraft end portion transportation device, comprising:
    an upper hull cradle and a lower hull carrier;
    the upper hull cradle comprising a plurality of cradle plates;
    the plurality of cradle plates attached to one another to form a cradle that can be removably wrapped around at least one of a bow and stern of a watercraft and at least a portion of an underside of a hull;
    a plurality of tie attachments integrated into the upper hull cradle;
    the plurality of tie attachments adapted to allow a plurality of tie cables to attach thereby to the upper hull cradle;
    a plurality of tie downs attached to the plurality of tie cables and adapted to be secured to a watercraft;
    the lower hull carrier attached to the upper hull cradle;
    the lower hull carrier comprising a plurality of hull carrier supports;
    the plurality of hull carrier supports attached to one another to form a carrier which supports the upper hull cradle above a carrier wheel assembly and provides additional protection;
    the plurality of hull carrier supports comprising at least two rear hull carrier supports which have proximal ends attached to the upper hull cradle and distal ends which extend downwards from the lower hull carrier and attach to a carrier wheel assembly;
    the at least two rear hull carrier supports adapted to act as shock absorbers so as to cushion any shocks experienced by the carrier wheel assembly and attenuate any shock energy before it can be transmitted to the upper hull cradle; and
    the carrier wheel assembly comprising at least a first wheel and a second wheel.

2. The small watercraft end portion transportation device of claim 1 wherein the carrier wheel assembly utilizes at least one axle attached to the distal end of each of the at least two rear hull carrier supports.

3. The small watercraft end portion transportation device of claim 2 wherein the first wheel is attached at a first end of the at least one axle and the second wheel is attached at a second end of the at least one axle.

4. The small watercraft end portion transportation device of claim 3 wherein the first wheel has a first tire attached thereto and the second wheel has a second tire attached thereto.

5. The small watercraft end portion transportation device of claim 4 wherein the first tire and the second tire are both knobby balloon tires adapted to provide protection against harsh terrain features such as sharp rocks.

6. The small watercraft end portion transportation device of claim 1 wherein the upper hull cradle is removably attached to the lower hull carrier.

7. The small watercraft end portion transportation device of claim 1 wherein the upper hull cradle is permanently attached to the lower hull carrier.

8. The small watercraft end portion transportation device of claim 1 wherein the plurality of cradle plates comprises an upper hull cradle top right plate, an upper hull cradle top left plate, an upper hull cradle mid right plate, an upper hull cradle mid left plate, an upper hull cradle center right plate, an upper hull cradle center left plate, an upper hull cradle rear right plate, and an upper hull cradle rear left plate.

9. The small watercraft end portion transportation device of claim 8 wherein the plurality of hull carrier supports comprises a lower hull carrier front right support, a lower hull carrier front left support, a lower hull carrier mid right support, a lower hull carrier mid left support, a lower hull carrier rear right support, and a lower hull carrier rear left support, and further comprising a plurality of protection pads attached to the upper hull cradle.

10. A small watercraft end portion transportation device, comprising:
    an upper hull cradle and a lower hull carrier;
    the upper hull cradle comprising a plurality of cradle plates;
    the plurality of cradle plates having a plurality of port cradle plates and a plurality of starboard cradle plates, and wherein each port cradle plate has a paired starboard cradle plate attached thereto to form a set of cradle plates, and taken altogether, a plurality of sets of cradle plates;
    each of the plurality of sets of cradle plates are attached to one another to form a cradle that can be removably wrapped around at least one of a bow and stern of a watercraft and at least a portion of an underside of a hull;
    a plurality of plate gaps located between each of the plurality of sets of cradle plates and adapted to allow the upper hull cradle to be custom-formed to match a shape of at least a bow or stern of a craft and wrap around to an underside of a hull of a craft;
    a plurality of tie downs attached to the upper hull cradle and adapted to be secured to a watercraft;
    the lower hull carrier attached to the upper hull cradle;
    the lower hull carrier comprising a plurality of hull carrier supports;
    the plurality of hull carrier supports attached to one another to form a carrier which supports the upper hull cradle above a carrier wheel assembly and provides additional protection;

the plurality of hull carrier supports comprising at least two rear hull carrier supports which have proximal ends attached to the upper hull cradle and distal ends which extend downwards from the lower hull carrier and attach to a carrier wheel assembly;

the at least two rear hull carrier supports adapted to act as shock absorbers so as to cushion any shocks experienced by the carrier wheel assembly and attenuate any shock energy before it can be transmitted to the upper hull cradle; and the carrier wheel assembly comprising at least a first wheel and a second wheel.

11. The small watercraft end portion transportation device of claim 10 wherein the carrier wheel assembly utilizes at least one axle attached to the distal end of each of the at least two rear hull carrier supports.

12. The small watercraft end portion transportation device of claim 11 wherein the first wheel is attached at a first end of the at least one axle and the second wheel is attached at a second end of the at least one axle.

13. The small watercraft end portion transportation device of claim 12 wherein the first wheel has a first tire attached thereto and the second wheel has a second tire attached thereto.

14. The small watercraft end portion transportation device of claim 13 wherein the first tire and the second tire are both knobby balloon tires adapted to provide protection against harsh terrain features such as sharp rocks.

15. The small watercraft end portion transportation device of claim 10 wherein the upper hull cradle is removably attached to the lower hull carrier.

16. The small watercraft end portion transportation device of claim 10 wherein the upper hull cradle is permanently attached to the lower hull carrier.

17. The small watercraft end portion transportation device of claim 10 further comprising a plurality of protection pads attached to the upper hull cradle, the plurality of protection pads comprising a upper hull cradle top protection pad, an upper hull cradle top-mid protection pad, an upper hull cradle mid protection pad, an upper hull cradle center protection pad, and an upper hull cradle rear protection pad.

18. The small watercraft end portion transportation device of claim 17 wherein the plurality of cradle plates comprises an upper hull cradle top right plate, an upper hull cradle top left plate, an upper hull cradle mid right plate, an upper hull cradle mid left plate, an upper hull cradle center right plate, an upper hull cradle center left plate, an upper hull cradle rear right plate, and an upper hull cradle rear left plate and wherein the plurality of hull carrier supports comprises a lower hull carrier front right support, a lower hull carrier front left support, a lower hull carrier mid right support, a lower hull carrier mid left support, a lower hull carrier rear right support, and a lower hull carrier rear left support.

19. A small watercraft end portion transportation device, comprising:

an upper hull cradle and a lower hull carrier;

the upper hull cradle comprising a plurality of cradle plates;

the plurality of cradle plates having a plurality of port cradle plates and a plurality of starboard cradle plates, and wherein each port cradle plate has a paired starboard cradle plate attached thereto to form a set of cradle plates, and taken altogether, a plurality of sets of cradle plates;

each of the plurality of sets of cradle plates are attached to one another to form a cradle that can be removably wrapped around at least one of a bow and stern of a watercraft and at least a portion of an underside of a hull;

a plurality of plate gaps located between each of the plurality of sets of cradle plates and adapted to allow the upper hull cradle to be custom-formed to match a shape of at least a bow or stern of a craft and wrap around to an underside of a hull of a craft;

a plurality of tie downs attached to the upper hull cradle and adapted to be secured to a watercraft;

the lower hull carrier attached to the upper hull cradle;

the lower hull carrier comprising a plurality of hull carrier supports;

the plurality of hull carrier supports attached to one another to form a carrier which supports the upper hull cradle above a carrier wheel assembly and provides additional protection;

the plurality of hull carrier supports having a plurality of port carrier supports and a plurality of starboard carrier supports, and wherein each port carrier support has a paired starboard carrier support attached thereto to form a set of carrier supports, and taken altogether, a plurality of sets of carrier supports;

each of the plurality of sets of carrier supports are attached to one another to form the hull carrier support;

a plurality of support gaps are located between each of the plurality of sets of carrier supports and are adapted to allow the lower carrier support to be custom-formed to match a shape of an underside of the upper hull cradle;

the plurality of hull carrier supports comprising at least two rear hull carrier supports which have proximal ends attached to the upper hull cradle and distal ends which extend downwards from the lower hull carrier and attach to a carrier wheel assembly;

the at least two rear hull carrier supports adapted to act as shock absorbers so as to cushion any shocks experienced by the carrier wheel assembly and attenuate any shock energy before it can be transmitted to the upper hull cradle; and the carrier wheel assembly comprising at least a first wheel and a second wheel.

20. The small watercraft end portion transportation device of claim 19, further comprising:

a plurality of protection pads attached to the upper hull cradle, the plurality of protection pads comprising a upper hull cradle top protection pad, an upper hull cradle top-mid protection pad, an upper hull cradle mid protection pad, an upper hull cradle center protection pad, and an upper hull cradle rear protection pad;

wherein the plurality of cradle plates comprises an upper hull cradle top right plate, an upper hull cradle top left plate, an upper hull cradle mid right plate, an upper hull cradle mid left plate, an upper hull cradle center right plate, an upper hull cradle center left plate, an upper hull cradle rear right plate, and an upper hull cradle rear left plate; and wherein the plurality of hull carrier supports comprises a lower hull carrier front right support, a lower hull carrier front left support, a lower hull carrier mid right support, a lower hull carrier mid left support, a lower hull carrier rear right support, and a lower hull carrier rear left support.

* * * * *